(12) United States Patent
Kim et al.

(10) Patent No.: US 11,456,797 B2
(45) Date of Patent: Sep. 27, 2022

(54) ELECTRONIC DEVICE AND METHOD FOR TRANSMITTING OR RECEIVING SIGNALS OF PLURALITY OF FREQUENCY BANDS

(71) Applicant: SAMSUNG ELECTRONICS CO., LTD., Suwon-si (KR)

(72) Inventors: Jooseung Kim, Suwon-si (KR); Namjun Cho, Suwon-si (KR); Hyoseok Na, Suwon-si (KR); Hyunseok Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/023,955

(22) Filed: Sep. 17, 2020

(65) Prior Publication Data
US 2021/0083755 A1 Mar. 18, 2021

(30) Foreign Application Priority Data
Sep. 18, 2019 (KR) .................. 10-2019-0114781

(51) Int. Cl.
*H03C 7/02* (2006.01)
*H04B 7/10* (2017.01)
(Continued)

(52) U.S. Cl.
CPC .............. *H04B 7/10* (2013.01); *H04B 17/10* (2015.01); *H04B 2001/0416* (2013.01)

(58) Field of Classification Search
CPC ... H04B 1/48; H04B 1/40; H04B 1/04; H04B 1/44; H04B 2001/0416; H04B 1/006; H04B 17/10; H04B 1/405; H04B 7/10
See application file for complete search history.

(56) References Cited

U.S. PATENT DOCUMENTS 10,003,366 B2   6/2018  Dimpflmaier et al.
2001/0005685 A1* 6/2001 Nishimori .............. H01Q 3/267
                                                    455/562.1
(Continued)

FOREIGN PATENT DOCUMENTS

WO   2014/205019   12/2014
WO   2017/040193    3/2017

OTHER PUBLICATIONS

International Search Report dated Dec. 8, 2020 in corresponding International Application No. PCT/KR2020/012533.

*Primary Examiner* — Nhan T Le
(74) *Attorney, Agent, or Firm* — Nixon & Vanderhye, P.C.

(57) ABSTRACT

The disclosure relates to a device and a method for efficiently detecting signals when signals of a plurality of frequency bands are simultaneously transmitted and/or received.
An electronic device according to various embodiments of the disclosure includes: a processor, a plurality of couplers configured to detect signals of a plurality of frequency bands being simultaneously transmitted and/or received, a plurality of first switches connected to at least parts of the plurality of couplers and configured to adjust directions of the signals being detected, a plurality of second switches connected to the first switches and configured to block signals being output from the first switches, and a third switch connected to the plurality of second switches and configured to select one of the plurality of second switches, wherein the processor is configured to control the first switches, the second switches, and the third switch to detect one of the signals being simultaneously transmitted and/or received.

14 Claims, 9 Drawing Sheets

(51) Int. Cl.
*H04B 17/10* (2015.01)
*H04B 1/04* (2006.01)

(56) References Cited

U.S. PATENT DOCUMENTS

| | | |
|---|---|---|
| 2008/0280574 A1 | 11/2008 | Rofougaran et al. |
| 2008/0299935 A1 | 12/2008 | Safarian et al. |
| 2014/0378075 A1 | 12/2014 | Verma et al. |
| 2016/0079649 A1* | 3/2016 | Ilkov ............... H04B 1/0458 343/858 |
| 2016/0112073 A1 | 4/2016 | Lum et al. |
| 2017/0064773 A1 | 3/2017 | Anderson et al. |
| 2017/0085292 A1* | 3/2017 | Jung ............... H04B 1/44 |
| 2017/0214321 A1* | 7/2017 | Li ............... H02J 7/34 |
| 2017/0365914 A1 | 12/2017 | Hong et al. |
| 2018/0159582 A1 | 6/2018 | Tseng et al. |
| 2019/0131684 A1 | 5/2019 | Jayaraman et al. |
| 2019/0173500 A1 | 6/2019 | Artemenko et al. |

* cited by examiner

ELECTRONIC DEVICE AND METHOD FOR TRANSMITTING OR RECEIVING SIGNALS OF PLURALITY OF FREQUENCY BANDS

CROSS-REFERENCE TO RELATED APPLICATION

This application is based on and claims priority under 35 U.S.C. § 119 to Korean Patent Application No. 10-2019-0114781 filed on Sep. 18, 2019, in the Korean Intellectual Property Office, the disclosure of which is incorporated by reference herein in its entirety.

BACKGROUND

Field

The disclosure relates to an electronic device and a method for transmitting and/or receiving signals of a plurality of frequency bands.

Description of Related Art

In case of transmitting and/or receiving signals in mobile communication, one carrier may be used. With the development of mobile communication, there has been a growing interest in a carrier aggregation (hereinafter, "CA") technology as a demand for a data rate increases. The CA technology may refer, for example, to a technology to realize a wider bandwidth through tying of two or more frequency bands into one. A technology whereby an electronic device transmits data to a base station using the CA technology may be an uplink CA (hereinafter, "ULCA") technology.

The CA technology may also be applied to other communication systems. As an example, the CA technology that is applied to an evolved universal terrestrial access network (E-UTRA) and a new radio (NR) which may be referred to as an E-UTRA/NR dual connectivity (hereinafter, "ENDC") technology.

An electronic device may detect an output power of a transmission signal in order to match the output power of the transmission signal with an output power of a transmission signal demanded by a base station. Where an electronic device simultaneously transmits and/or receives signals of a plurality of frequency bands, this may exert an influence on a signal being detected to identify the output power of the transmission signal.

SUMMARY

Embodiments of the disclosure provide an electronic device that may secure isolation of the signal being detected.

Embodiments of the disclosure, the electronic device may secure the isolation of the signals being detected to identify the transmission output even if the signals of the plurality of frequency bands are simultaneously transmitted and/or received.

Embodiments of the disclosure provide an electronic device that can be efficient in cost or size by sharing a part of a circuit processing the detected signals even if the signals of the plurality of frequency bands are simultaneously transmitted and/or received.

Embodiments of the disclosure make it possible to detect the signals being simultaneously transmitted and/or received without the necessity of adding a component to the electronic device or reconfiguring the circuit even in case that the frequencies are reframed.

An electronic device according to various example embodiments of the disclosure may include: a processor; a plurality of couplers configured to detect signals of a plurality of frequency bands being simultaneously transmitted and/or received; a plurality of first switches connected to at least parts of the plurality of couplers and configured to adjust directions of the signals being detected; a plurality of second switches connected to the first switches and configured to block signals output from the first switches; and a third switch connected to the plurality of second switches and configured to select one of the plurality of second switches, wherein the processor may be configured to control the first switches, the second switches, and the third switch to detect one of the signals being simultaneously transmitted and/or received.

An electronic device according to various example embodiments of the disclosure may include: a processor; a plurality of couplers configured to detect signals of a plurality of frequency bands being simultaneously transmitted and/or received; a plurality of first switches connected to at least parts of the plurality of couplers and configured to control directions of the signals being detected; a plurality of second switches connected to the first switches and configured to block signals output from the first switches; and a third switch connected to the plurality of second switches and configured to select one of the plurality of second switches, wherein the processor may be configured to: adjust the first switches connected to the couplers detecting the signals being simultaneously transmitted and/or received excluding a signal being detected in a reverse direction, and adjust the first switch connected to the coupler detecting the one of the signals being simultaneously transmitted and/or received in a forward direction.

An electronic device according to various example embodiments of the disclosure may include: at least one transceiver; a first front end module including a first coupler connected to the at least one transceiver and configured to detect a signal of a first frequency band being transmitted and/or received; a second front end module including a second coupler connected to the at least one transceiver and configured to detect a signal of a second frequency band being transmitted and/or received; a first switch electrically connected to the first coupler and configured to block a signal being output; a second switch electrically connected to the second coupler and configured to block a signal being output; and a third switch configured to select any one of the signal being output from the first switch and the signal being output from the second switch.

A method for operating an electronic device according to various embodiments of the disclosure may include: simultaneously transmitting and/or receiving signals of a plurality of frequency bands; selecting the signal being detected among the signals of the plurality of frequency bands being simultaneously transmitted and/or received; and blocking a signal excluding the selected signal, wherein the selecting and the blocking may be performed through time division.

According to the various example embodiments of the disclosure, the electronic device can secure the isolation of the signals being detected to identify the transmission output even if the signals of the plurality of frequency bands are simultaneously transmitted and/or received.

According to the various example embodiments of the disclosure, the electronic device can be efficient in cost or size by sharing a part of a circuit processing the detected signals even if the signals of the plurality of frequency bands are simultaneously transmitted and/or received.

According to the various example embodiments of the disclosure, it is possible to detect the signals being simultaneously transmitted or received without the necessity of adding a component to the electronic device or reconfiguring the circuit even in case that the frequencies are reframed.

Effects that can be obtained in the disclosure are not limited to the above-described effects, and other unmentioned effects can be clearly understood by those of ordinary skill in the art to which the disclosure pertains from the following detailed description.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Hereinafter, various example embodiments of the disclosure will be described with reference to the accompanying drawings.

Figure 1:
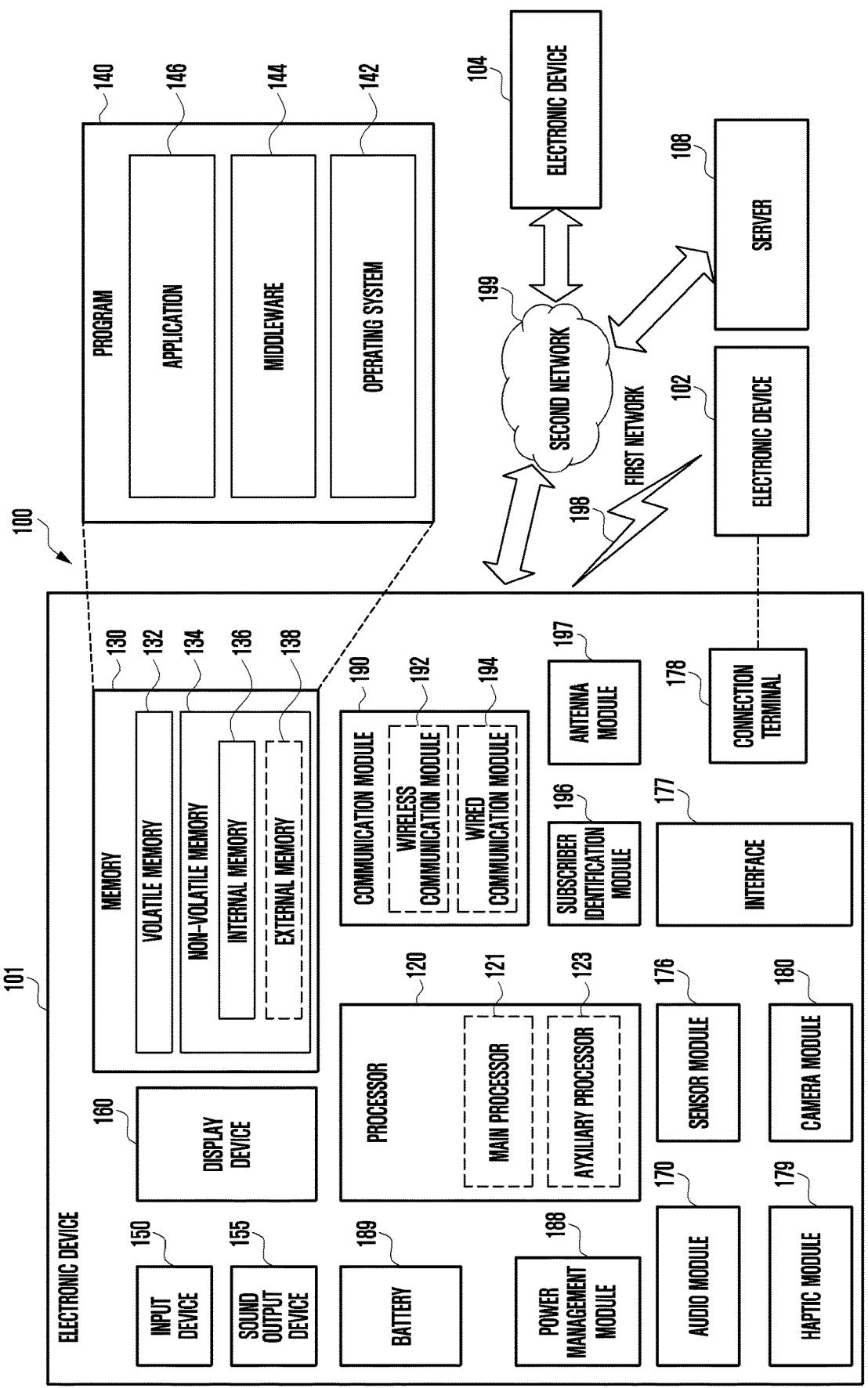
FIG. 1 is a block diagram illustrating an example electronic device in a network environment 100 according to various embodiments of the disclosure.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element include a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, and without limitation, a portable communication device (e.g., a smartphone), a computer device, a portable multimedia device, a portable medical device, a camera, a wearable device, a home appliance, or the like. According to an embodiment of the disclosure, the electronic devices are not limited to those described above.

An electronic device (e.g., electronic device 101 of FIG. 1) may match an output power of a transmission signal with an output power of a transmission signal demanded by a base station. The electronic device 101 may detect the output power of the transmission signal, and may adjust the strength of the output power of the signal being transmitted by the electronic device 101 in comparison with the transmission output power demanded by the base station. For example, the electronic device 101 may adjust the strength of the output power of the transmission signal by controlling the gain of a processor (e.g., communication processor (CP) or coprocessor 123) or a power amplifier (PA) of a transceiver.

In case the electronic device 101 can process signals of a plurality of frequency bands, but does not simultaneously transmit or receive the plurality of signals, only one circuit configuration is sufficient to detect the outputs of the transmission/reception signals. However, with the development of technology, the electronic device 101 can simultaneously transmit and/or receive the signals of the plurality of frequency bands.

Hereinafter, according to various example embodiments of the disclosure, an example method and configuration will be described, in which the electronic device 101 detects signals of a plurality of frequency bands being simultaneously transmitted and/or received.

According to various example embodiments of the disclosure, an electronic device 101 can process signals through time division for each frequency band.

Figure 2:
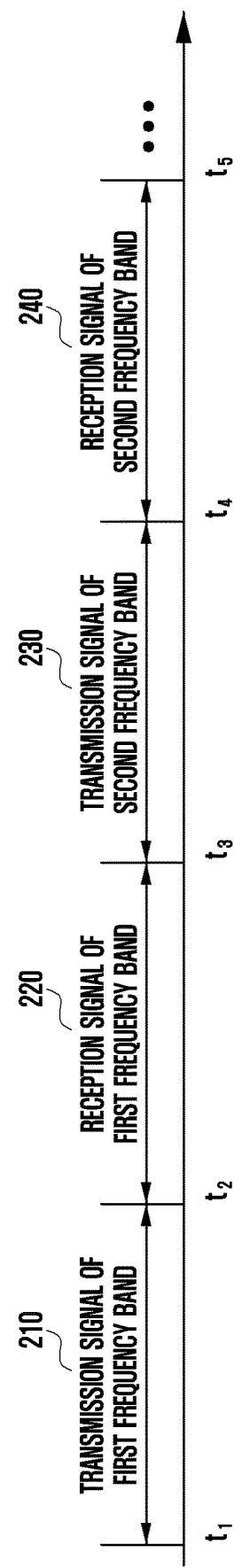
FIG. 2 is a diagram illustrating example signals being detected by an electronic device for each frequency band in terms of time according to various embodiments of the disclosure.

FIG. 2 is a diagram illustrating example signals being detected by an electronic device for each frequency band in terms of time according to various embodiments of the disclosure.

As illustrated in FIG. 2, an electronic device (e.g., electronic device 101 of FIG. 1) may detect a transmission signal of a first frequency band at a first interval ($t_1$ to $t_2$) (210), and may detect a reception signal of a first frequency band at a second interval ($t_2$ to $t_3$) (220). The electronic device 101 may detect a transmission signal of a second frequency band at a third interval ($t_3$ to $t_4$) (230), and may detect a reception signal of a second frequency band at a fourth interval ($t_4$ to $t_5$) (240).

In an embodiment, time required to detect respective signals may be constant or may differ. The order of detecting the signals may not be limited.

For example, if the electronic device 101 supports an ENDC technology, the first and second frequency bands may be respective frequency bands being used in a long term evolution (LTE) or new radio (NR) communication system. For example, if the electronic device 101 is a device supporting a CA technology, the first and second frequency bands may be different frequency bands being simultaneously used in one communication system.

Figure 3:
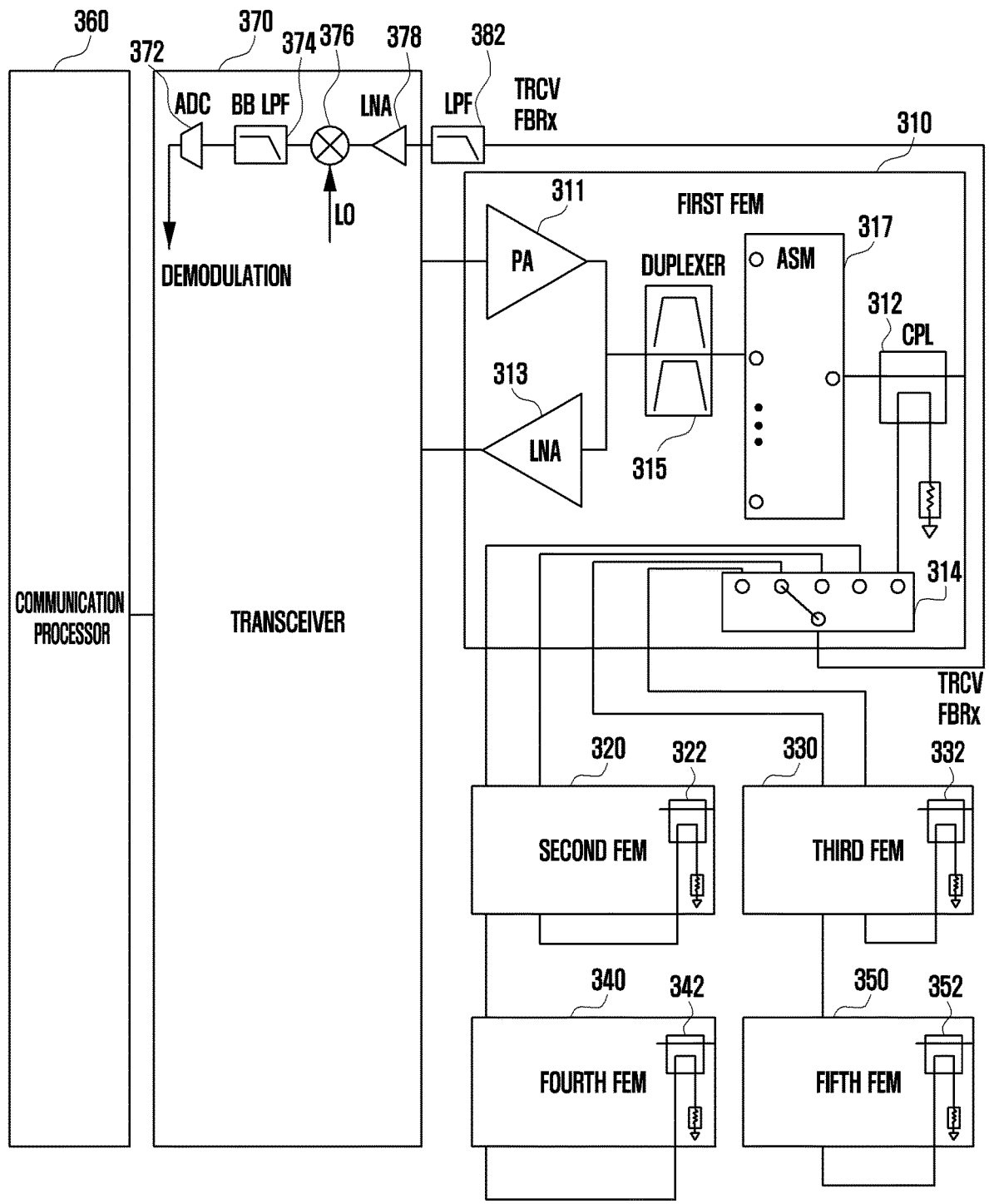
FIG. 3 is a diagram illustrating an example partial configuration of an electronic device according to various embodiments of the disclosure.

FIG. 3 is a diagram illustrating an example partial configuration of an electronic device according to various embodiments of the disclosure.

With reference to FIG. 3, an electronic device (e.g., electronic device 101 of FIG. 1) may include a communication processor (hereinafter, "CP") (e.g., including processing circuitry) 360, a transceiver 370, and a plurality of front end modules (hereinafter, "FEMs") 310, 320, 330, 340, and 350.

The CP 360 may include various processing circuitry and transmit and/or receive data through the transceiver 370, and as needed, may control the FEMs. The transceiver 370 may transmit and/or receive signals to and/or from at least one of the FEMs 310, 320, 330, 340, and 350.

According to an embodiment, the electronic device 101 may include at least one of the first to fifth FEMs 310, 320, 330, 340, and 350 processing the signals being transmitted and/or received. For example, the first to fifth FEMs 310, 320, 330, 340, and 350 may be formed by frequency bands.

According to an embodiment, each of the first to fifth FEMs 310, 320, 330, 340, and 350 may include at least one of a coupler 312 detecting the signals being transmitted and/or received, a power amplifier (hereinafter, "PA") 311, a low-noise amplifier (hereinafter, "LNA") 313, a duplexer 315, and/or an antenna switch module (hereinafter, "ASM") 317. Each of the first to fifth FEMs 310, 320, 330, 340, and 350 may include the PA 311 and the duplexer 315, and it may be referred to, for example, as a power amplifier module including a duplexer (PAMiD).

According to an embodiment, the first FEM 310 may include a switch 314. The switch 314 may select a signal intended to be detected among signals of a plurality of frequency bands. As an example, although FIG. 3 illustrates that the first FEM 310 includes the switch 314, other FEMs (e.g., the second to fifth FEMs 320, 330, 340, and 350) may include the switch 314. The switch 314 included in the first FEM 310 may select any one of outputs of a coupler 312 of the first FEM 310, a coupler 322 of the second FEM 320, a coupler 332 of the third FEM 330, a coupler 342 of the fourth FEM 340, and/or a coupler 352 of the fifth FEM 350. For example, in FIG. 3, an output of the coupler 352 of the fifth FEM 350 may be connected to the switch 314 to be detected. The detected signal may be demodulated after being processed by a low pass filter (LPF) 382, an LNA 378, a mixer 376, a baseband low pass filter (BB LPF) 374, and/or an analog-to-digital converter 372.

According to an embodiment, if the frequency band that can be processed by the electronic device 101 is increased, the size of the switch 314 included in the first FEM 310 is increased, and thus the size of the first FEM 310 may also be increased. If the size of the first FEM 310 including the switch 314 is limited, the interval between respective ports of the switch 314 is narrowed, and interference may occur. For example, in case that the electronic device 101 supports the ENDC and simultaneously transmits signals of two frequency bands, the signals of the two frequency bands being simultaneously transmitted are all connected to one port of the switch 314 through the couplers, and only one of the signals may be detected through the switch 314. Because the signals of the two frequency bands being simultaneously transmitted are all connected to the one port of the switch 314 through the couplers, the two signals being simultaneously transmitted may be coupled to each other, and thus may exert an influence on the detected signal. If the signal being not desired to be detected is coupled to the signal being intended to be detected between the two signals being simultaneously transmitted, performance deterioration may occur. For example, if the frequency of the signal being not desired to be detected is equal to or similar to a multiplier of the frequency of the signal intended to be detected, the frequency component of the signal being not desired to be detected may be combined with a harmonic component of the frequency of a local oscillator (LO) of the mixer 376 to be down-converted into a baseband, and thus the demodulation performance may deteriorate.

As another example, intermodulation may occur between the signal being not desired to be detected and the signal intended to be detected in the low-noise amplifier 378 in the transceiver 370. Accordingly, a jammer may be formed in the frequency band of the signal intended to be detected, and the demodulation performance may deteriorate.

Hereinafter, an example in which the electronic device according to various embodiments of the disclosure resolves the deterioration of the demodulation performance with respect to the signal intended to be detected will be described.

Figure 4:
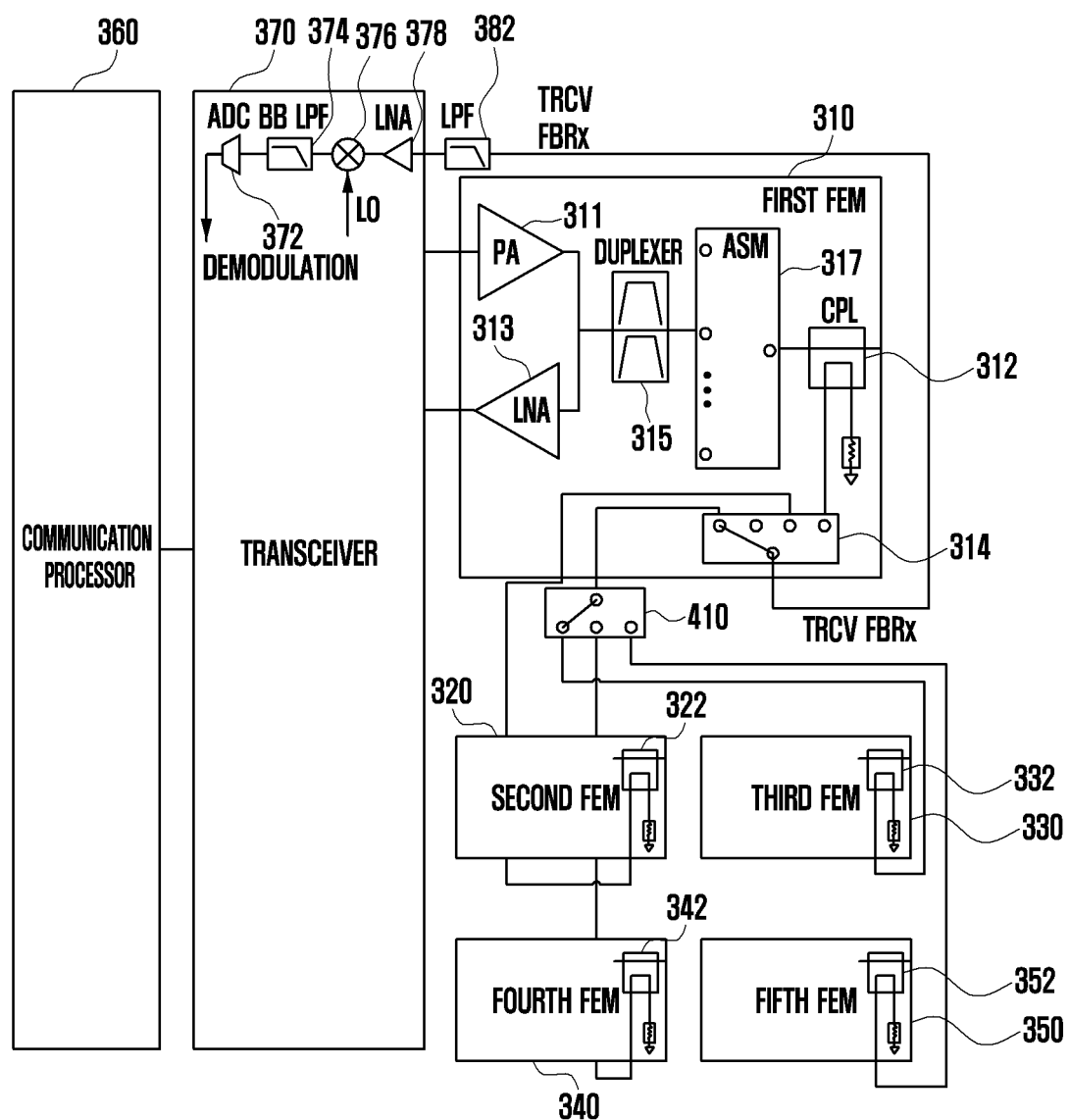
FIG. 4 is a diagram illustrating an example configuration in which switches are connected in series according to various embodiments of the disclosure.

FIG. 4 is a diagram illustrating an example configuration in which switches are connected in series according to various embodiments of the disclosure.

If the signal intended to be detected is selected through the switch 314 included in the first FEM 310 as shown in FIG. 3, interference may occur between the switch ports. According to various embodiments of the disclosure, the switch 314 included in the first FEM 310 may be connected in series to a switch 410 deployed outside the first FEM 310. In an embodiment, the switch 410, which can select any one of outputs of the coupler 332 of the third FEM 330, the coupler 342 of the fourth FEM 340, and the coupler 352 of the fifth FEM 350, may be deployed outside the first to fifth FEMs 310 to 350, and may be connected in series to the switch 314 of the first FEM 310. For example, the switch 314 of the first FEM 310 may select one of outputs of the coupler 312 of the first FEM 310, the coupler 322 of the second FEM 320, and the switch 410. As an example, as illustrated in FIG. 4, the signal being transmitted or received through the third FEM 330 may be detected through the switches 314 and 410.

In an embodiment, the switch 410 deployed outside the first to fifth FEMs 310 to 350 may have superior inter-port isolation performance than the switch 314 included inside the first FEM 310. When being connected to the switch 314, the switch 410 and the second FEM 320 being not connected to the switch 410 may be respectively connected to the ports of the switch 314 spaced apart to secure the isolation.

Figure 5:
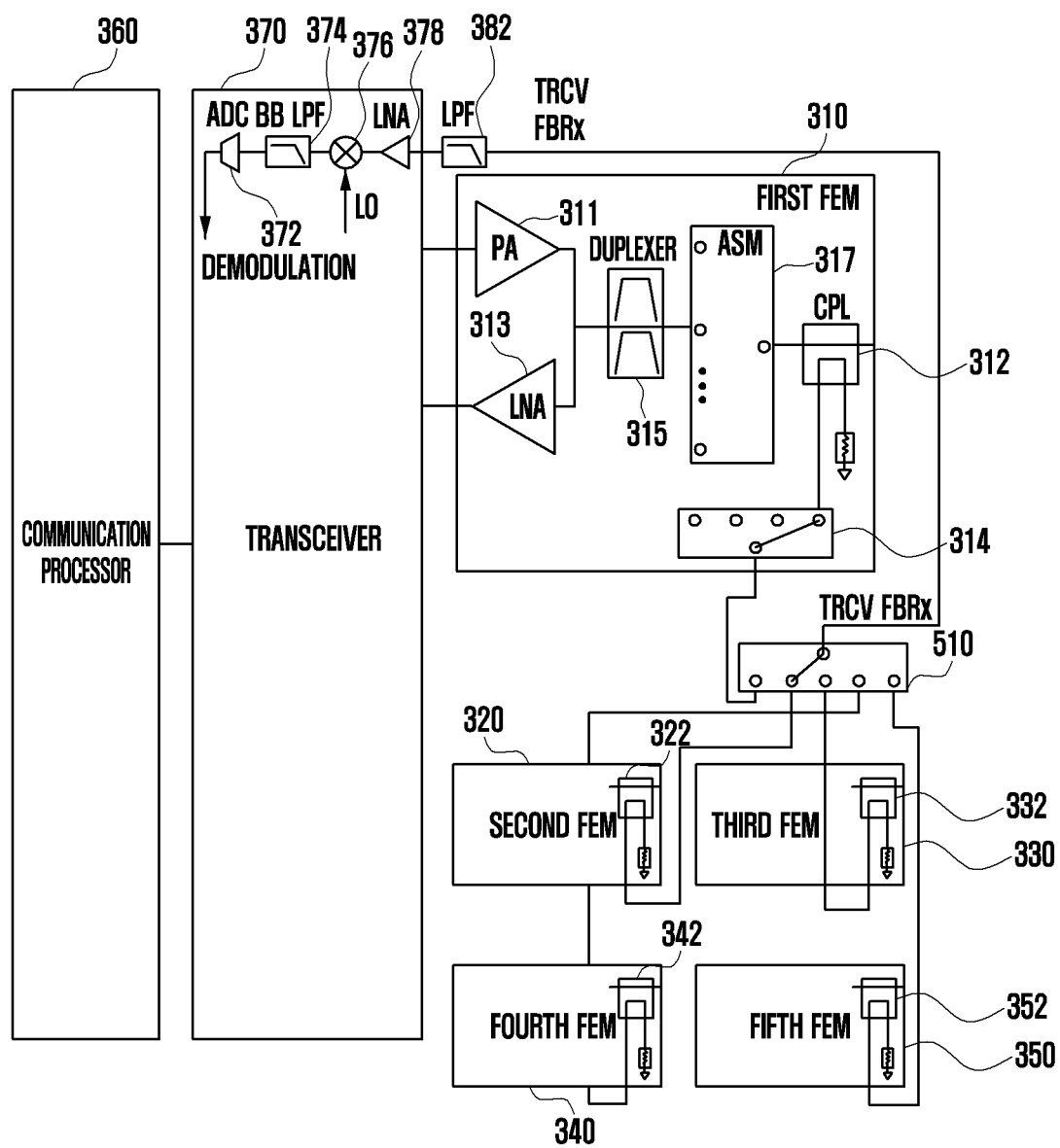
FIG. 5 is a diagram illustrating an example configuration in which switches are connected to outside according to various embodiments of the disclosure.

FIG. 5 is a diagram illustrating an example configuration in which switches are connected to outside according to various embodiments of the disclosure.

In general, the isolation performance of the switch may be determined by the distance between ports. For example, the switch having a good isolation performance may have a relatively large size. In FIG. 5, in order to improve the isolation performance of the signal intended to be detected, a switch 510 securing the isolation between switch ports may be included.

In an embodiment, the switch 510 may select any one of outputs of the coupler 312 of the first FEM 310, the coupler 322 of the second FEM 320, the coupler 332 of the third FEM 330, the coupler 342 of the fourth FEM 340, and/or the coupler 352 of the fifth FEM 350. For example, as illustrated in FIG. 5, the signal being transmitted or received through the second FEM 320 may be detected through the switch 510.

In an embodiment, the inter-port isolation of the switch 314 may be lower than the inter-port isolation of the switch 510. As another example, the switch 314 may always be connected to the first FEM 310. As still another example, the switch 314 may be omitted, and the first FEM 310 may be directly connected to the switch 510.

Figure 6:
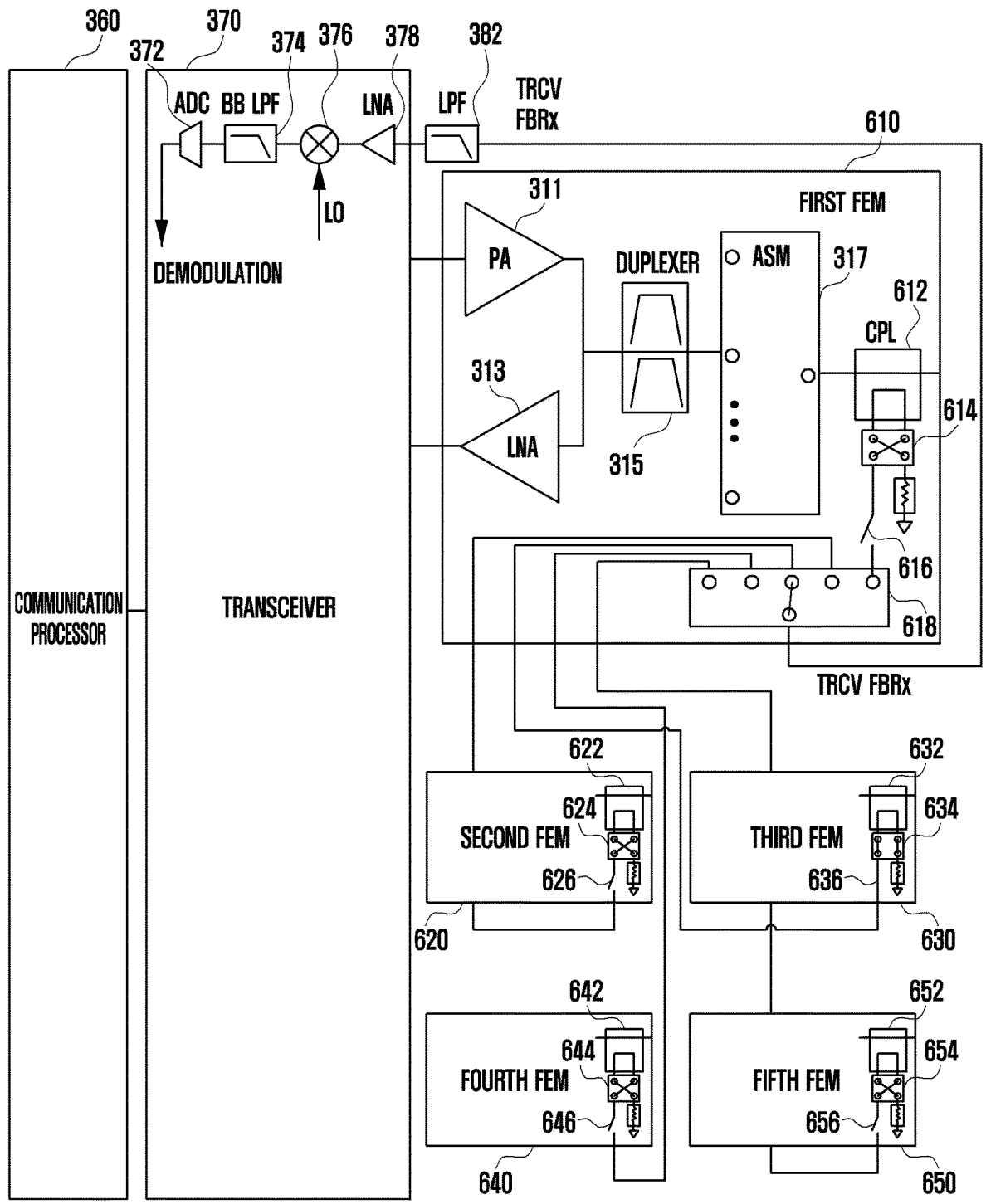
FIG. 6 is a diagram illustrating an example configuration to detect signals of a plurality of frequency bands being simultaneously transmitted and/or received according to various embodiments of the disclosure.

FIG. 6 is a diagram illustrating an example configuration to detect signals of a plurality of frequency bands being simultaneously transmitted and/or received according to various embodiments of the disclosure.

In FIG. 6, explanation of the configurations similar to those of FIG. 3 may be not be repeated.

According to various embodiments, each FEM may further include at least one switch. As an example, the switch may control the direction of the signal detected through the coupler. The first FEM 610 may include a double pole double throw (DPDT) switch 614. According to an embodiment, the DPDT switch 614 may be connected to both ends of the coupler 612, the output port of the coupler 612, and a ground port. The DPDT switch 614 may control the direction of the signal being detected through the coupler 612. For example, if the DPDT switch 614 is connected in a forward direction, the detected signal may be output, whereas if it is connected in a reverse direction, the detected signal may not be output. The direction of the signal depending on the connection of the DPDT switch 614 will be described in greater detail below with reference to FIG. 7. The DPDT switch 614 can detect a transmission signal and a reception signal. The DPDT switch 614 can block the output of the signal, which is simultaneously transmitted and/or received, but is not desired to be detected, and thus the isolation performance of the signal intended to be detected can be improved.

In the disclosure, although the DPDT switch has been described by way of non-limiting example, any configuration capable of changing the direction of the signal flow may be possible.

According to an embodiment, the first FEM 610 may further include a switch 616. The switch 616 may connect or disconnect the output port of the coupler 612 to or from the switch 618. In case that the switch 616 is further included in the first FEM 610, the signal being detected through the output port of the coupler 612 can be blocked, and thus the isolation performance can be further improved.

According to an embodiment, in case that the switch 616 is included in the first FEM 610, a similar effect to the case where the switches are connected in series as shown in FIG. 4 can be obtained. As another example, in case that each of the respective FEMs includes the switch therein, it may be mounted on a printed circuit board (PCB), and may have a similar isolation effect to the case where the large switch is included as shown in FIG. 5.

According to an embodiment, in the same manner as the first FEM 610, the second FEM 620 may include a DPDT switch 624 and/or a switch 626, the third FEM 630 may include a DPDT switch 634 and/or a switch 636, the fourth FEM 640 may include a DPDT switch 644 and/or a switch 646, and/or the fifth FEM 650 may include a DPDT switch 654 and/or a switch 656. The switches included in the respective FEMs may have substantially the same functions as the switches included in the first FEM 610 as described above.

In FIG. 6, as an example, because the DPDT switch 634 of the third FEM 630 is connected in a forward direction, the switch 636 is connected to be "on", and the switch 618 of the first FEM 610 also selects the output of the coupler 632 of the third FEM 630, the signal of the frequency band being transmitted and/or received through the third FEM 630 can be detected.

Figure 7:
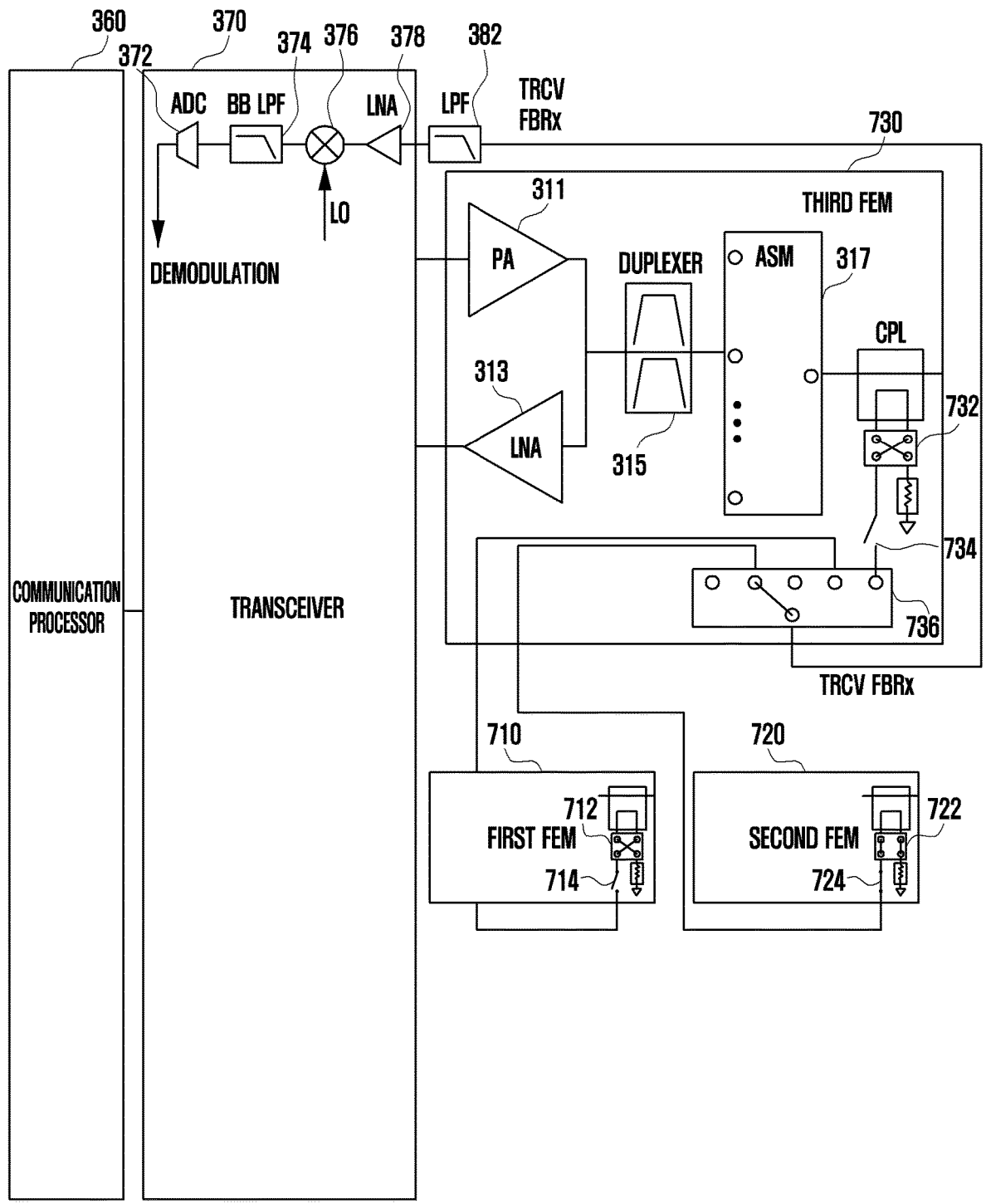
FIG. 7 is a diagram illustrating an example state of a switch detecting signals of two frequency bands in case of simultaneously transmitting the signals of the two frequency bands according to various embodiments of the disclosure.

FIG. 7 is a diagram illustrating an example state of a switch detecting signals of two frequency bands in case of simultaneously transmitting the signals of the two frequency bands according to various embodiments of the disclosure.

According to an embodiment, the electronic device (e.g., electronic device 101 of FIG. 1) may simultaneously transmit signals of two frequency bands, for example, a signal of the first frequency band and a signal of the second frequency band, among signals of a plurality of frequency bands. In FIG. 7, the signal of the first frequency band may be processed by the first FEM 710, and the signal of the second frequency band may be processed by the second FEM 720. FIG. 7 illustrates states of switches 712, 714, 722, 724, 732, 734, and 736 included in FEMs 710, 720, and 730 in case that the electronic device 101 detects the signal of the second frequency band as an example. The electronic device 101 may detect the signal of the second frequency band by configuring the DPDT switch 722 in the second FEM 720 in a forward direction and connecting the switch 724 to be "on". On the other hand, the electronic device 101 may block the signal of the first frequency band by configuring the DPDT switch 712 in the first FEM 710 in a reverse direction and configuring the switch 714 to be "off".

As another example, in case of detecting the signal of the first frequency band, the electronic device 101 may block the signal of the second frequency band by configuring the DPDT switch 722 in the second FEM 720 in a reverse direction and opening the switch 724. The electronic device 101 may detect the signal of the first frequency band by configuring the DPDT switch 712 in the first FEM 710 in a forward direction and connecting the switch 714 to be "on".

According to an embodiment, the third FEM 730 may further include a switch 736 selecting a signal for being detected between the signal of the first frequency band and the signal of the second frequency band.

According to an embodiment, in order to detect the signals for simultaneously transmitting the signals of the two frequency bands, at least one of the switches 712, 722, 714, and 724 included in the first FEM 710 and the second FEM 720 may be adjusted in accordance with a divided time. According to an embodiment, at least one of the switches 712, 722, 714, and 724 may be controlled by the communication processor 360.

According to an embodiment, even if the signals of the two frequency bands are simultaneously transmitted, the signals can be detected through the time division, and the isolation of the signal being detected using the switches in the FEMs can be increased. For example, different isolations can be secured in case that the electronic device 101 uses only the coupler and in case that the electronic device 101 connects the coupler and the DPDT switch and adjusts the direction of the DPDT switch. For example, in case that the electronic device 101 uses only the coupler, it is possible to secure the isolation of about 24 dB, and in case that the electronic device 101 connects the coupler and the DPDT switch and adjusts the direction of the DPDT switch, it is possible to secure the isolation of about 40 dB.

According to an embodiment, the electronic device 101 may increase the isolation by adjusting the direction of the DPDT switches 712 and 722 connected to the couplers in the FEMs. For example, additional isolation of about 16 dB can be increased through adjustment of the direction of the DPDT switches 712 and 722. The electronic device 101 may further include switches 714 and 724 connected to the DPDT switches 712 and 722 and capable of blocking the output signals, and may additionally increase the isolation. For example, the electronic device 101 may include the DPDT switches 712 and 722 and the switches 714 and 724, and may increase the isolation of about 30 to 40 dB. For example, the electronic device 101 may increase the isolation at the level of about 60 to 70 dB between the signal intended to be detected and the otherwise signal between the signals of the two frequency bands being simultaneously transmitted.

In an embodiment, the electronic device 101 may include a separate switch (e.g., switch 410 of FIG. 4) outside the FEMs 710, 720, and 730. For example, at least one of the switches 714 and 724 may be deployed outside the FEMs 710 and 720. Accordingly, during demodulation of signals being detected and fed back, the performance deterioration due to intermodulation distortion (IMD) or harmonic with the signal, of which the detection is not desired, can be reduced.

Figure 8:
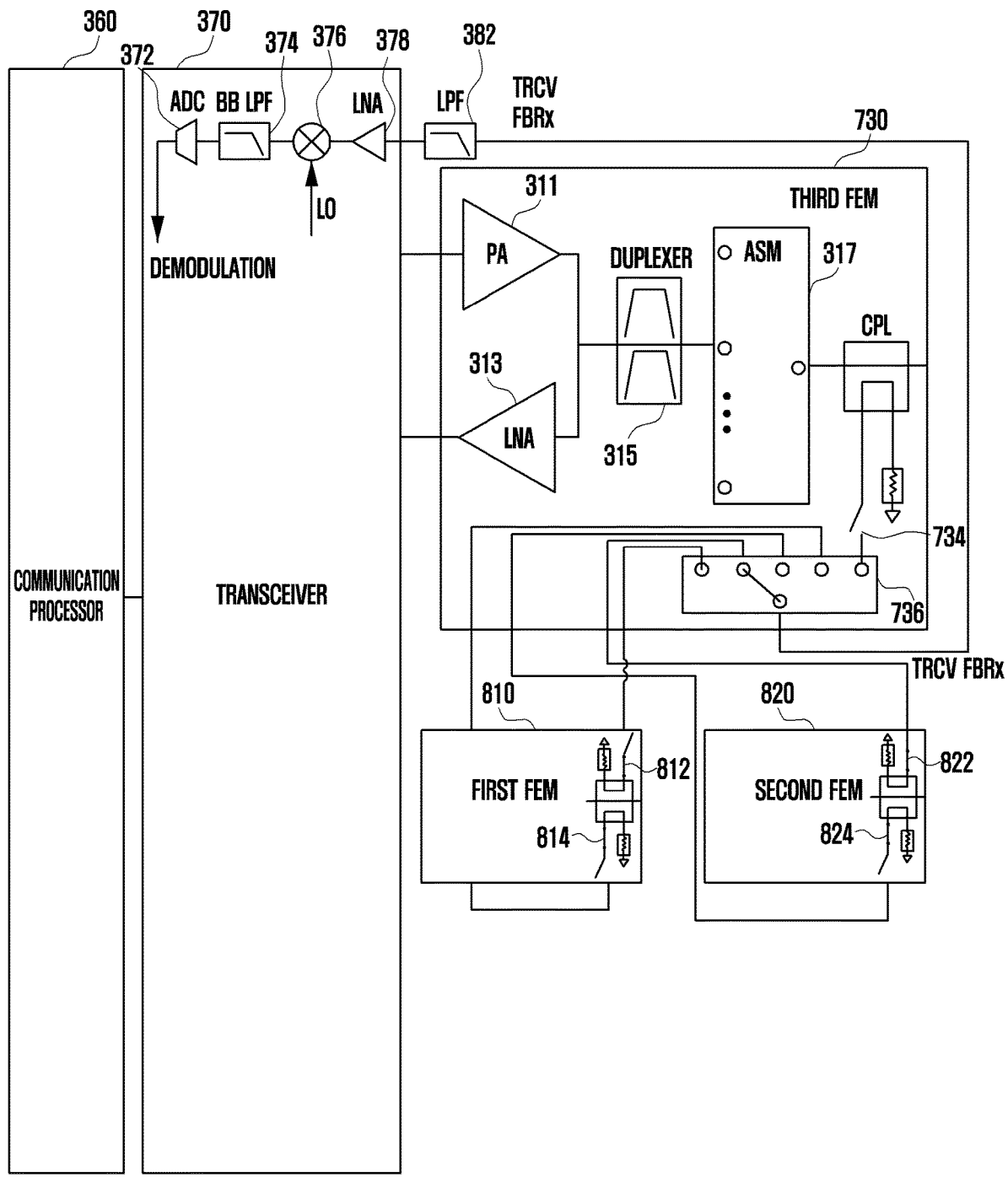
FIG. 8 is a diagram illustrating an example configuration to detect signals of a plurality of frequency bands in case of simultaneously transmitting and/or receiving the signals of the plurality of frequency bands according to various embodiments of the disclosure.

FIG. 8 is a diagram illustrating an example configuration to detect signals of a plurality of frequency bands in case of simultaneously transmitting or receiving the signals of the plurality of frequency bands according to various embodiments of the disclosure.

According to an embodiment, the electronic device (e.g., electronic device 101 of FIG. 1) may include a communication processor (e.g., including processing circuitry) 360, a transceiver 370, a first FEM 810, a second FEM 820, and/or a third FEM 730. With reference to FIG. 8, the second FEM 810 or the configurations excluding the second FEM 820 may be substantially the same as those of FIG. 7.

According to an embodiment, the DPDT switch (e.g., DPDT switch 712 of FIG. 7) may not be included in at least one of the FEMs 810, 820, and 730. According to an embodiment, in the first FEM 810, the transmission signal of the first frequency band may be detected or blocked by the switch 812, and the reception signal may be detected or blocked by the switch 814. As another example, in the second FEM 820, the transmission signal of the second frequency band may be detected or blocked by the switch 822, and the reception signal may be detected or blocked by the switch 824.

As an example, in FIG. 8, because the switch 822 of the second FEM 820 is connected to be "on", and the switch 736 of the third FEM 730 is connected to the switch 822 of the second FEM 820, the transmission signal of the second frequency band being processed by the second FEM 820 can be detected.

Figure 9:
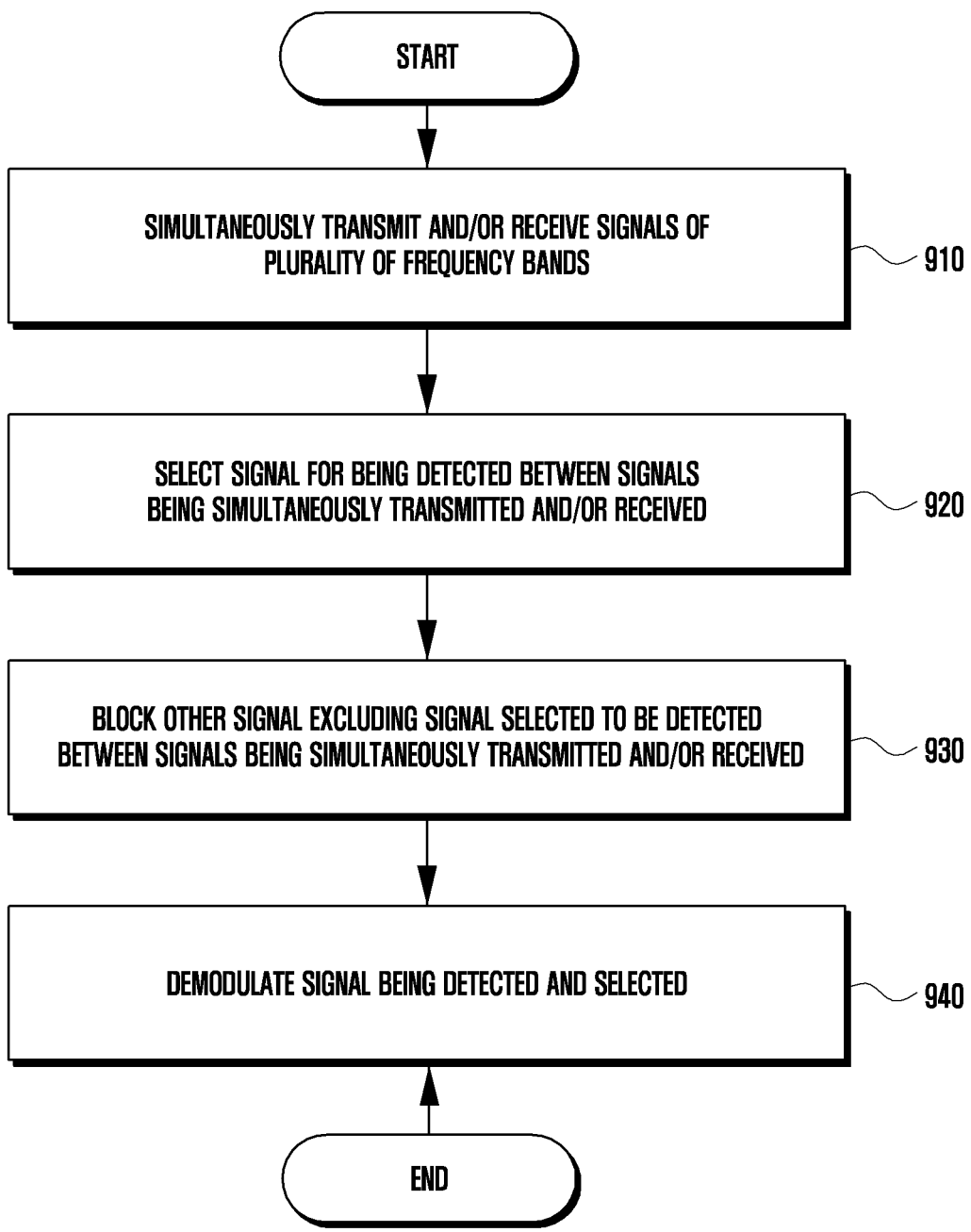
FIG. 9 is a flowchart illustrating an example method for detecting signals of a plurality of frequency bands in case that an electronic device simultaneously transmits and/or receives the signals of the plurality of frequency bands according to various embodiments of the disclosure.

FIG. 9 is a flowchart illustrating an example method for detecting signals of a plurality of frequency bands in case that an electronic device simultaneously transmits or receives the signals of the plurality of frequency bands according to various embodiments of the disclosure.

According to various example embodiments of the disclosure, the electronic device (e.g., electronic device 101 of FIG. 1) may include a communication processor (e.g., CP 360 of FIG. 3), a transceiver (e.g., transceiver 370 of FIG. 3), and/or a plurality of front end modules (e.g., a first FEM 610 and a second FEM 620 of FIG. 6). The plurality of front end modules may further include a switch (e.g., a double pole double throw (DPDT) switch 614 of FIG. 6), and/or a coupler (e.g., coupler 612 of FIG. 6).

According to various embodiments of the disclosure, at operation 910, the electronic device 101 may simultaneously transmit and/or receive signals of a plurality of frequency bands. For example, the electronic device 101 may identify whether to simultaneously transmit or receive a plurality of signals. The electronic device 101 includes a plurality of FEMs (e.g., first to fifth FEMs 610, 620, 630, 640, and 650 of FIG. 6), and thus can simultaneously transmit or receive the signals of the plurality of frequency bands.

According to various embodiments of the disclosure, at operation 920, the electronic device 101 may select a signal detected from the signals being simultaneously transmitted or received. The signal detection may be performed using couplers (e.g., couplers 612, 622, 632, 642, and 652 in the first to fifth FEMs of FIG. 6) included in the plurality of FEMs, and the signal for being detected may be one of the signals of the plurality of frequency bands, and may be selected through a switch (e.g., switch 618 of FIG. 6). The electronic device 101 may include at least one switch (e.g., switch 618 of the first FEM of FIG. 6), and may select the signal for being detected through the at least one switch. As an example, if the switch (e.g., switch 636 of the third FEM 630 of FIG. 6) is connected to be "on", or if the double pole double throw switch is connected in a forward direction (e.g., double pole double throw switch 634 of the third FEM 630 of FIG. 6), the signal passing through the switches (e.g., the double pole double throw switch 634 of the third FEM 630 of FIG. 6, the switch 636 of the third FEM 630, and the switch 618) may be detected.

According to various embodiments of the disclosure, at operation 930, the electronic device 101 may block the signal excluding the signal selected to be detected between the signals being simultaneously transmitted and/or received. For example, the blocking may be performed using the switch (e.g., switch 626 of the second FEM 620 of FIG. 6). In another embodiment, the electronic device 101 may perform the blocking by changing the transmission direction of the signal being blocked using the double pole double throw switch (e.g., double pole double throw switch 624 of the second FEM 620 of FIG. 6) to the reverse direction.

According to various embodiments of the disclosure, at operation 940, the electronic device 101 may demodulate the signal selected and detected. A feedback path, which is a path for processing the detected signal to be demodulated, may be the same path regardless of the frequency band of the signal being detected. The feedback path may be, for example, a path in which the detected signal is processed until the signal is demodulated through the transceiver after the switch (e.g., switch 618 in the first FEM 610 of FIG. 6) for selecting the signal for being detected. In another embodiment, in case of adding the double pole double throw switch (e.g., double pole double throw switch 634 of the third FEM 630 of FIG. 6), the electronic device may change the transmission direction of the double pole double throw switch to a forward direction in order to connect the signal being detected to the feedback path.

In another embodiment, the electronic device 101 may control the switches based on time using the processor. The electronic device may include a memory, and a program for controlling the switches may be stored in the memory.

An electronic device (e.g., electronic device 101 of FIG. 1) according to various example embodiments of the disclosure may include: a processor (e.g., communication processor 360 of FIG. 6), a plurality of couplers (e.g., couplers 612, 622, 632, 642, and 652) configured to detect signals of a plurality of frequency bands being simultaneously transmitted and/or received, a plurality of first switches (e.g., switches 614, 624, 634, 644, and 654) connected to at least parts of the plurality of couplers and configured to control directions of the signals being detected, a plurality of second switches (e.g., switches 616, 626, 636, 646, and 656) connected to the first switches and configured to block signals being output from the first switches, and a third switch (e.g., switch 618 of FIG. 6) connected to the plurality of second switches and configured to select one of the plurality of second switches, wherein the processor may be configured to control at least two of the first switches, the second switches, and the third switch to detect one of the signals being simultaneously transmitted and/or received.

In the electronic device (e.g., electronic device 101 of FIG. 1) according to various example embodiments of the disclosure, the processor may be configured to control the first switch (e.g., switch 634 of FIG. 6) connected to the coupler (e.g., coupler 632 of FIG. 6) detecting one of the signals of the plurality of frequency bands being simultaneously transmitted and/or received in a forward direction.

In the electronic device (e.g., electronic device 101 of FIG. 1) according to various example embodiments of the disclosure, the processor 360 may be configured to control the second switch (e.g., switch 636 of FIG. 6) connected to the first switch (e.g., switch 634 of FIG. 6) being controlled in the forward direction to be "on".

In the electronic device (e.g., electronic device 101 of FIG. 1) according to various example embodiments of the disclosure, the processor may be configured to control the first switches (e.g., switches 614, 624, 644, and 654 of FIG. 6) connected to the couplers (e.g., couplers 612, 622, 642, and 652 of FIG. 6) excluding the couplers detecting signals of the plurality of frequency bands being simultaneously transmitted and/or received in a reverse direction.

In the electronic device (e.g., electronic device 101 of FIG. 1) according to various example embodiments of the disclosure, the processor may be configured to control the second switches (switches 616, 626, 646, and 656 of FIG. 6) connected to the first switches (e.g., switches 614, 624, 644, and 654 of FIG. 6) being controlled in the reverse direction to be "off".

In the electronic device (e.g., electronic device 101 of FIG. 1) according to various example embodiments of the disclosure, the processor may be configured to control at least one of the plurality of first switches (e.g., switches 614, 624, 634, 644, and 654 of FIG. 6), the plurality of second switches (e.g., switches 616, 626, 636, 646, and 656 of FIG. 6), and the third switch (e.g., switch 618 of FIG. 6) based on time.

In the electronic device (e.g., electronic device 101 of FIG. 1) according to various example embodiments of the disclosure, at least one of the plurality of first switches (e.g., switches 614, 624, 634, 644, and 654 of FIG. 6), the plurality of second switches (e.g., switches 616, 626, 636, 646, and 656 of FIG. 6), and the third switch (e.g., switch 618 of FIG. 6) may be controlled by a stored program executed by the processor.

In the electronic device (e.g., electronic device 101 of FIG. 1) according to various example embodiments of the disclosure, the first switches (e.g., switches 614, 624, 634, 644, and 654 of FIG. 6) and the second switches (e.g., switches 616, 626, 636, 646, and 656 of FIG. 6) may be different kinds of switches.

An electronic device (e.g., electronic device 101 of FIG. 1) according to various example embodiments of the disclosure may include a processor (e.g., communication processor 360 of FIG. 6), a plurality of couplers (e.g., couplers 612, 622, 632, 642, and 652) configured to detect signals of a plurality of frequency bands being simultaneously transmitted and/or received, a plurality of first switches (e.g., switches 614, 624, 634, 644, and 654) connected to at least parts of the plurality of couplers and configured to adjust directions of signals being detected, a plurality of second switches (e.g., switches 616, 626, 636, 646, and 656) connected to the first switches and configured to block signals being output from the first switches, and a third switch (e.g., switch 618 of FIG. 6) connected to the plurality of second switches and configured to select one of the plurality of second switches, wherein the processor 360 may be configured to adjust the first switches (e.g., switches 614, 624, 644, and 654 of FIG. 6) connected to the couplers (e.g., couplers 612, 622, 642, and 652 of FIG. 6) detecting the signals being simultaneously transmitted and/or received excluding a signal being detected in a reverse direction and to adjust the first switch (e.g., switch 634 of FIG. 6) connected to the coupler (e.g., coupler 632 of FIG. 6) detecting the one of the signals being simultaneously transmitted and/or received in a forward direction.

An electronic device (e.g., electronic device 101 of FIG. 1) according to various example embodiments of the disclosure may include at least one transceiver (e.g., transceiver 370 of FIG. 6), a first front end module (e.g., first front end module 610 of FIG. 6) including a first coupler (e.g., coupler 612 of FIG. 6) configured to detect a signal of a first frequency band being transmitted and/or received, a second front end module (e.g., second front end module 620 of FIG. 6) including a second coupler (e.g., coupler 622 of FIG. 6) configured to detect a signal of a second frequency band being transmitted and/or received, a first switch (e.g., switch 616 of FIG. 6) electrically connected to the first coupler (e.g., coupler 612 of FIG. 6) and configured to block the signal being output, a second switch (e.g., switch 626 of FIG. 6) electrically connected to the second coupler 622 and configured to block the signal being output, and a third switch (e.g., switch 618 of FIG. 6) configured to select any one of the signal being output from the first switch and the signal being output from the second switch.

The electronic device (e.g., electronic device 101 of FIG. 1) according to various example embodiments of the disclosure may further include a processor (e.g., communication processor 360 of FIG. 3) configured to control the first switch (e.g., switch 616 of FIG. 6), the second switch and the third switch (switch 618 of FIG. 6) in accordance with time.

In the electronic device (e.g., electronic device 101 of FIG. 1) according to various example embodiments of the disclosure, the first front end module (e.g., first front end module 610 of FIG. 6) may further include a fourth switch (e.g., switch 614 of FIG. 6) configured to control a direction of the signal being detected from the first coupler, and the second front end module (e.g., second front end module 620 of FIG. 6) may further include a fifth switch (e.g., switch 624 of FIG. 6) configured to control a direction of the signal being detected from the second coupler.

In the electronic device (e.g., electronic device 101 of FIG. 1) according to various example embodiments of the disclosure, one of the fourth switch (e.g., switch 614 of FIG. 6) or the fifth switch (e.g., switch 624 of FIG. 6) electrically connected to the third switch (e.g., switch 618 of FIG. 6) may be controlled in a forward direction, and the other switch of the fifth or fourth switch may be controlled in a reverse direction.

In the electronic device (e.g., electronic device 101 of FIG. 1) according to various example embodiments of the disclosure, the third switch (e.g., switch 618 of FIG. 6) may be included in any one of the first front end module (e.g., first front end module 610 of FIG. 6) or the second front end module (e.g., second front end module 620 of FIG. 6).

A method for operating an electronic device (e.g., electronic device 101 of FIG. 1) according to various example embodiments of the disclosure may include simultaneously transmitting and/or receiving signals of a plurality of frequency bands (e.g., operation 910 of FIG. 9), selecting a signal detected among the signals of the plurality of frequency bands being simultaneously transmitted and/or received (e.g., operation 920 of FIG. 9), and blocking a signal excluding the selected signal (e.g., operation 930 of FIG. 9), wherein the selecting and the blocking may be performed through time division.

In the method for operating an electronic device (e.g., electronic device 101 of FIG. 1) according to various example embodiments of the disclosure, selecting (e.g., operation 920 of FIG. 9) may include adjusting the direction of a switch (e.g., switch 634 of FIG. 6) connected to transmission paths of the signals being simultaneously transmitted and/or received in a forward direction.

In the method for operating an electronic device (e.g., electronic device 101 of FIG. 1) according to various example embodiments of the disclosure, blocking (e.g., operation 930 of FIG. 9) may include adjusting the direction of switches (e.g., switches 614, 624, 644, and 654 of FIG. 6) connected to transmission paths of the signals being simultaneously transmitted and/or received in a reverse direction.

In the method for operating an electronic device (e.g., electronic device 101 of FIG. 1) according to various example embodiments of the disclosure, selecting (e.g., operation 920 of FIG. 9) may include controlling a switch (e.g., switch 636 of FIG. 6) connected to transmission paths of the signals being simultaneously transmitted and/or received to be "on".

In the method for operating an electronic device (e.g., electronic device 101 of FIG. 1) according to various example embodiments of the disclosure, blocking (e.g., operation 920 of FIG. 9) may include controlling the switches (e.g., switches 616, 626, 646, and 656 of FIG. 6) connected to the transmission paths of the signals being simultaneously transmitted and/or received to be "off".

In the method for operating an electronic device (e.g., electronic device 101 of FIG. 1) according to various example embodiments of the disclosure, selecting (e.g., operation 920 of FIG. 9) may include controlling a plurality of switches connected to transmission paths of the signals being simultaneously transmitted and/or received to be "on" or in a forward direction.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-d escribed components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by one of ordinary skill in the art that various changes in form and detail may be made without departing from the true spirit and full scope of the disclosure, including the appended claims and their equivalents.

What is claimed is:

1. An electronic device comprising:
a processor;
a plurality of couplers configured to detect signals of a plurality of frequency bands being simultaneously transmitted and/or received;
a plurality of first switches connected to at least parts of the plurality of couplers and configured to adjust directions of the signals being detected;
a plurality of second switches connected to the first switches and configured to block signals being output from the first switches; and
a third switch connected to the plurality of second switches and configured to select one of the plurality of second switches,
wherein the processor is configured to control the first switches, the second switches, and the third switch to detect one of the signals being simultaneously transmitted and/or received.

2. The electronic device of claim 1, wherein the processor is configured to control one of the plurality of first switches connected to one of the plurality of couplers detecting one of the signals being simultaneously transmitted and/or received in a forward direction.

3. The electronic device of claim 2, wherein the processor is configured to control one of the plurality of second switches connected to the one of the plurality of first switches being controlled in the forward direction to be on.

4. The electronic device of claim 2, wherein the processor is configured to control the first switch excluding the one of the plurality of first switches in a reverse direction.

5. The electronic device of claim 4, wherein the processor is configured to control the second switches connected to the first switches being controlled in the reverse direction among the plurality of second switches to be off.

6. The electronic device of claim 1, wherein the processor is configured to control at least one of the plurality of first switches, the plurality of second switches, and the third switch based on time.

7. The electronic device of claim 1, wherein at least one of the plurality of first switches, the plurality of second switches, and the third switch is controlled by a stored program executed by the processor.

8. The electronic device of claim 1, wherein the plurality of first switches and the plurality of second switches include different kinds of switches.

9. An electronic device comprising:
a processor;
a plurality of couplers configured to detect signals of a plurality of frequency bands being simultaneously transmitted and/or received;
a plurality of first switches connected to at least parts of the plurality of couplers and configured to control directions of the signals being detected;
a plurality of second switches connected to the first switches and configured to block signals being output from the first switches; and
a third switch connected to the plurality of second switches and configured to select one of the plurality of second switches,
wherein the processor is configured to adjust the first switches connected to the couplers detecting the signals being simultaneously transmitted and/or received excluding a signal being detected in a reverse direction and to adjust the first switch connected to the coupler detecting the one of the signals being simultaneously transmitted and/or received in a forward direction.

10. An electronic device comprising:
at least one transceiver;
a first front end module including a first coupler connected to the at least one transceiver and configured to detect a signal of a first frequency band being transmitted and/or received;
a second front end module including a second coupler connected to the at least one transceiver and configured to detect a signal of a second frequency band being transmitted and/or received;
a first switch electrically connected to the first coupler and configured to block the signal of the first frequency band being output through the first coupler;
a second switch electrically connected to the second coupler and configured to block the signal of the second frequency band being output through the second coupler; and
a third switch configured to select any one of the signal being output from the first switch and the signal being output from the second switch.

11. The electronic device of claim 10, further comprising a processor configured to control the first switch, the second switch and the third switch based on time.

12. The electronic device of claim 10, wherein the first front end module further includes a fourth switch configured to control a direction of the signal being detected from the first coupler, and
the second front end module further includes a fifth switch configured to control a direction of the signal being detected from the second coupler.

13. The electronic device of claim 12, wherein one of the fourth switch or the fifth switch electrically connected to the third switch is controlled in a forward direction, and the other of the fourth switch or the fifth switch is controlled in a reverse direction.

14. The electronic device of claim 10, wherein the third switch is included in any one of the first front end module or the second front end module.

* * * * *